(12) United States Patent
Maher et al.

(10) Patent No.: US 11,785,462 B2
(45) Date of Patent: Oct. 10, 2023

(54) REGISTRATION AND AUTHENTICATION OF A DRONE, GROUND CONTROL STATION, AND USER FOR FLIGHTS LEVERAGING A WIDE AREA NETWORK

(71) Applicant: Verizon Patent and Licensing Inc., Basking Ridge, NJ (US)

(72) Inventors: Dana Maher, Portland, OR (US); Daniel William McMillan, Portland, OR (US); David Brian Rinaldi, Jr., Portland, OR (US); Jared Nelson Muirhead, Portland, OR (US); Tera Lynn Schroeder, West Linn, OR (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 207 days.

(21) Appl. No.: 17/139,061

(22) Filed: Dec. 31, 2020

(65) Prior Publication Data
US 2022/0210644 A1    Jun. 30, 2022

(51) Int. Cl.
| | |
|---|---|
| *G06F 21/00* | (2013.01) |
| *H04W 12/069* | (2021.01) |
| *H04W 76/10* | (2018.01) |
| *B64D 45/00* | (2006.01) |
| *H04W 12/08* | (2021.01) |
| *H04W 12/041* | (2021.01) |
| *H04W 60/00* | (2009.01) |

(52) U.S. Cl.
CPC .......... *H04W 12/069* (2021.01); *B64D 45/00* (2013.01); *H04W 12/041* (2021.01); *H04W 12/08* (2013.01); *H04W 60/00* (2013.01); *H04W 76/10* (2018.02)

(58) Field of Classification Search
CPC . H04W 12/069; H04W 12/041; H04W 12/08; H04W 12/10; H04W 4/00; H04W 60/00; H04W 76/10; H04L 63/0823; B64D 45/00; B64C 39/024; B64C 2201/14
See application file for complete search history.

(56) References Cited

U.S. PATENT DOCUMENTS

| | | | | |
|---|---|---|---|---|
| 2017/0357273 | A1* | 12/2017 | Michini | G05D 1/0033 |
| 2017/0366359 | A1* | 12/2017 | Scarlata | H04L 9/14 |
| 2018/0136645 | A1* | 5/2018 | Hong | G05D 1/0022 |
| 2018/0253092 | A1* | 9/2018 | Trapero Esteban | B64C 39/024 |
| 2019/0129415 | A1* | 5/2019 | Lai | H04W 60/04 |

(Continued)

OTHER PUBLICATIONS

Rodrigues et al., "Authentication Methods for UAV Communication," 2019 IEEE Symposium on Computers and Communications (ISCC), 2019, pp. 1210-1215, doi: 10.1109/ISCC47284.2019. 8969732. (Year: 2019).*

*Primary Examiner* — Kendall Dolly (57) ABSTRACT

A device may include a memory and a processor. The device may receive, from a ground control station (GCS) associated with an unmanned aerial vehicle (UAV), credentials associated with a user. The device may determine whether the GCS has been registered and determine, in response to determining that the GCS has been registered, whether the UAV has been registered. The device may present, in response to determining that the UAV has been registered, a list of UAVs the user is authorized to operate and receive selection of a particular UAV from the list of UAVs. The device may facilitate operational activities of the particular UAV.

20 Claims, 7 Drawing Sheets

(56) References Cited

U.S. PATENT DOCUMENTS

| | | | |
|---|---|---|---|
| 2019/0266899 A1* | 8/2019 | Ringer | G06Q 10/00 |
| 2021/0088337 A1* | 3/2021 | Koubaa | G05D 1/104 |
| 2021/0209956 A1* | 7/2021 | Allouche | G05D 1/0011 |
| 2022/0053329 A1* | 2/2022 | Kim | G06F 21/30 |
| 2023/0058405 A1* | 2/2023 | Chen | B64C 39/024 |

* cited by examiner

REGISTRATION AND AUTHENTICATION OF A DRONE, GROUND CONTROL STATION, AND USER FOR FLIGHTS LEVERAGING A WIDE AREA NETWORK

BACKGROUND INFORMATION

The use of Unmanned Aerial Vehicles (UAVs), also referred to as drones, is increasing. It is anticipated that drones may fly over large distances and be operated by a controller over a cellular network. In addition, drones may collect data and send the data back to the controller over the cellular network and other data networks. It is important to maintain a high level of security to ensure that control of the drone and transmission of the data is not compromised.

DETAILED DESCRIPTION OF PREFERRED EMBODIMENTS

The following detailed description refers to the accompanying drawings. The same reference numbers in different drawings may identify the same or similar elements.

More and more frequently, drones are being used to collect and transmit telemetry information, such as data collected from sensors on the drones. The drones may receive control signals from a controller or ground control station (GCS) and may transmit the telemetry information to the GCS or to another device. In some situations, a drone may include short range wireless communication capability (e.g., Wi-Fi) to communicate with the controller via unlicensed frequency bands. However, the range of the short range wireless communication may be limited. Many advanced drone operations may extend beyond the limitations of short range wireless communication. Therefore, many drone operators may need to fly drones using a wide area wireless network (such as a cellular network) to provide communications services.

Managed drone communications may require a more secure connection than most GCS-to-drone communications bindings because the control signals transmitted from the GCS to the drone and the telemetry information transmitted from the drone to the GCS or another device may cross a network topology that includes both the wide area wireless network and a data network, such as the Internet. In order to ensure that the control signals and the telemetry information are not compromised, the connection, registration, and authentication of the drone and GCS must be secure. Additionally, a user controlling the GCS and operating the drone should be securely authenticated.

Implementations described herein may provide a secure means for performing operational activities associated with a drone by registering a GCS and a drone prior to performing the operational activities. In one implementation, upon using a GCS and drone for the first time, the GCS and drone may be registered and issued a private key and digital certificate. In another implementation, the drone, the GCS, and a user of the drone must be authenticated prior to performing operational activities using the drone and the GCS.

Figure 1:
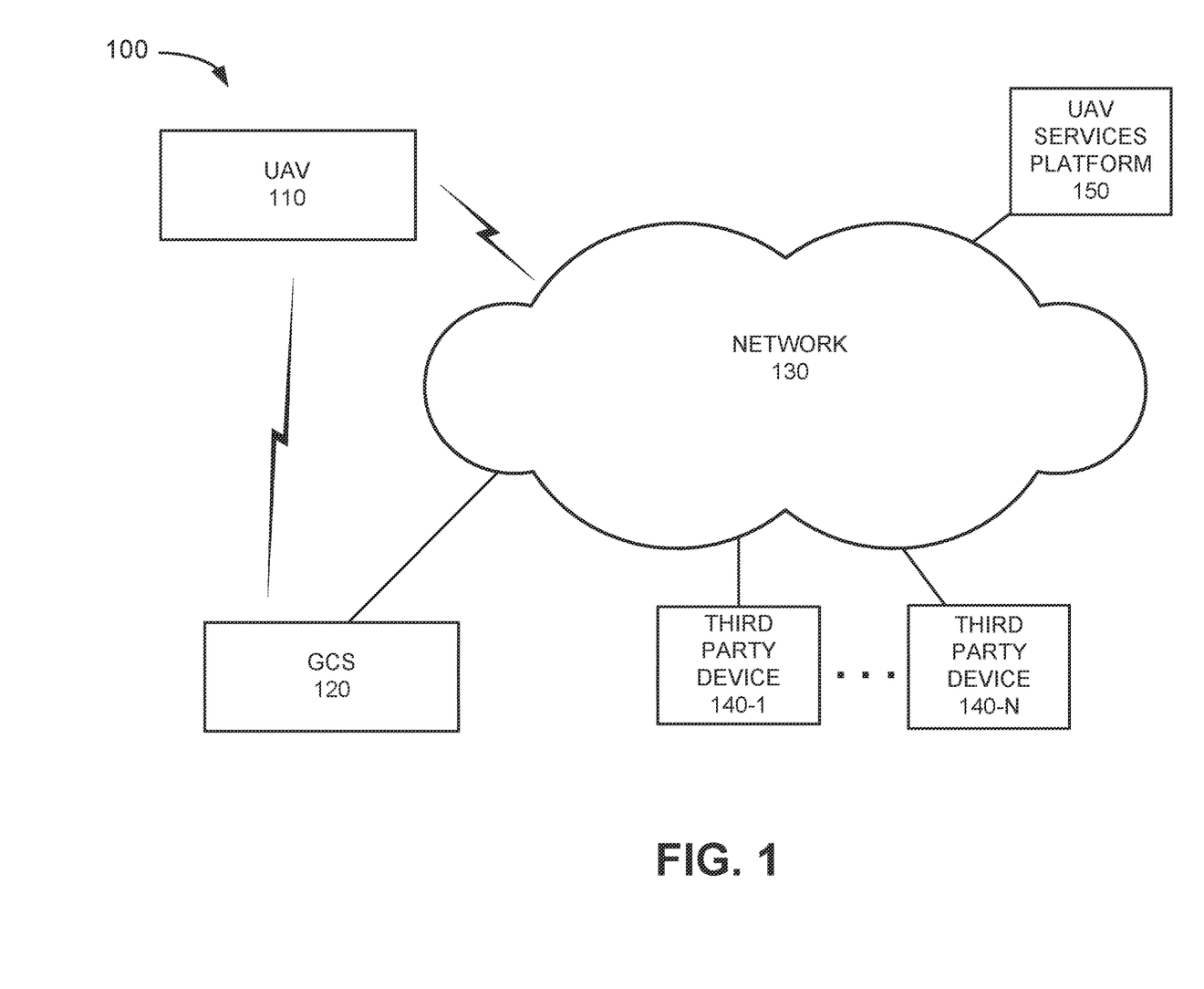
FIG. 1 illustrates an exemplary environment in which systems and methods described herein may be implemented.

FIG. 1 is a diagram illustrating an exemplary environment 100 in which systems and methods described herein may be implemented. Referring to FIG. 1, environment 100 includes UAV 110 (also referred to herein as drone 110), GCS 120, network 130, third party devices 140 to 140-N, and UAV services platform 150.

UAV 110 may include an aircraft (e.g., a single rotor aircraft, multirotor aircraft or fixed wing aircraft) that receives control signals from a controller, such as GCS 120. In implementations described herein, UAV 110 may receive signals from a transmitter associated with the controller to control the flight of UAV 110. For example, the altitude of UAV 110 may be changed via signals from GCS 120 to maneuver UAV 110 based on the particular flight goals. In some implementations, UAV 110 may include cellular communication capability (e.g., fourth generation long term evolution (4G LTE) communication capability, fifth generation (5G) communication capability, etc.) to allow UAV 110 to receive commands from a remotely located GCS 120 and/or a short range wireless communication capability (e.g., Wi-Fi) to allow UAV 110 to receive commands from GCS 120 located relatively close to UAV 110, as described in detail below.

GCS 120 may include a controller to control operation of UAV 110. For example, GCS 120 may include a user interface to allow a user to control the flight pattern of UAV 110, receive information from various sensors on UAV 110, operate a camera on UAV 110, read information from various sensors on UAV 110, etc. In some implementations, GCS 120 may be located in relatively close proximity to UAV 110 and control operation of UAV 110 wirelessly via a short range connection (e.g., Wi-Fi). In other implementations, GCS 120 may be located remotely with respect to UAV 110. In this implementation, GCS 120 may include any computer device used to transmit information to UAV 110 (e.g., commands) and receive data from UAV 110 (e.g., telemetry information) over network 130. For example, GCS 120 may include a mobile phone, laptop computer, tablet computer, desktop computer, wearable computer (e.g., eyeglasses or wristwatch), etc., that includes communication functionality and is able to provide, for example, commands to UAV 110 via network 130 and receive telemetry information from UAV 110 via network 130, as described in detail below.

In one implementation, GCS 120 may include a user device that is integrated with hardware that is associated with UAV 110. For example, UAV 110 may be associated with GCS hardware that may be integrated with (e.g., plugged into, installed on, etc.) a user device to allow the device to control operations of UAV 110. In this way, the user device may provide the input, output, and display for GCS 120 to allow an operator to send commands to UAV 110 and receive telemetry and other information from UAV 110. In addition, GCS 120 may include a cloud service that interacts with and/or controls UAV 110 with minimal user input. For example, GCS 120 may receive scheduling information from a user and may interact with UAV 110 without additional user input.

Network 130 may include one or more wired and/or wireless networks that are capable of receiving and transmitting data, voice and/or video signals. For example, network 130 may include one or more public switched telephone networks (PSTNs) or other type of switched network. Network 130 may also include one or more wireless networks and may include a number of wireless stations for receiving wireless signals and forwarding the wireless signals toward the intended destinations. Network 130 may further include one or more satellite networks, one or more packet switched networks, such as an Internet protocol (IP) based network, a software defined network (SDN), a local area network (LAN), a personal area network (PAN), a Wi-Fi network, a Bluetooth network, a wide area network (WAN), a long term evolution (LTE) network, a fourth generation (4G) network, a 4G LTE Advanced network, a fifth generation (5G) network, an intranet, the Internet, or another type of network that is capable of transmitting data. Network 130 may provide packet-switched services and wireless Internet protocol (IP) connectivity to various components in environment 100, such as UAV 110, GCS 120, third party devices 140, and UAV services platform 150 to provide, for example, data, voice, and/or multimedia services.

In one implementation, network 130 may include a cellular network used to transmit commands from GCS 120 to UAV 110 to control operations of UAV 110. In another implementation, network 130 may include a cellular network to transmit telemetry information from UAV 110 to GCS 120. In another implementation, network 130 may include a data network, such as the Internet, to transmit from UAV 110 to GCS 120 and/or third party devices 140. Additionally, network 130 may include a combination of networks, such as a cellular network and a data network.

Third party devices 140 may each include any type of computing device, such as a mobile telephone, laptop computer, tablet computer, desk top computer, etc., that includes communication functionality. Third party devices 140 may receive telemetry information from UAV 110. For example, a third party device 140 may be associated with a client or customer associated with UAV 110 and third party device 140 may receive telemetry information from UAV 110 via network 130.

UAV services platform 150 may include one or more computing devices configured to interface with UAV 110 and GCS 120 to provide various services to UAV 110 and UAV operators. For example, UAV services platform 150 may facilitate registering UAV 110 and/or GCS 120 prior to use. In one implementation, UAV services platform 150 may generate a hardware key and certificate pair for UAV 110 and/or GCS 120 and may issue a private key and digital certificate to UAV 110 and/or GCS 120. In addition, UAV services platform 150 may authenticate a user (e.g., of a third party device 140), UAV 110, and/or GCS 120 to perform operational activities.

The exemplary configuration illustrated in FIG. 1 is provided for clarity. It should be understood that a typical environment may include more or fewer devices than illustrated in FIG. 1. For example, environment 100 may include a large number (e.g., hundreds or more) of UAVs 110, user devices 120, and third party devices 140. Environment 100 (e.g., network 130) may also include elements, such as evolved NodeBs (eNodeBs), next generation NodeBs (gNodeBs), base stations, switches, gateways, routers, monitoring devices, etc. (not shown), that aid in routing data in environment 100.

Various operations are described below as being performed by particular components in environment 100. In other implementations, various operations described as being performed by one device may be performed by another device or multiple other devices, and/or various operations described as being performed by multiple devices may be combined and performed by a single device.

Figure 2:
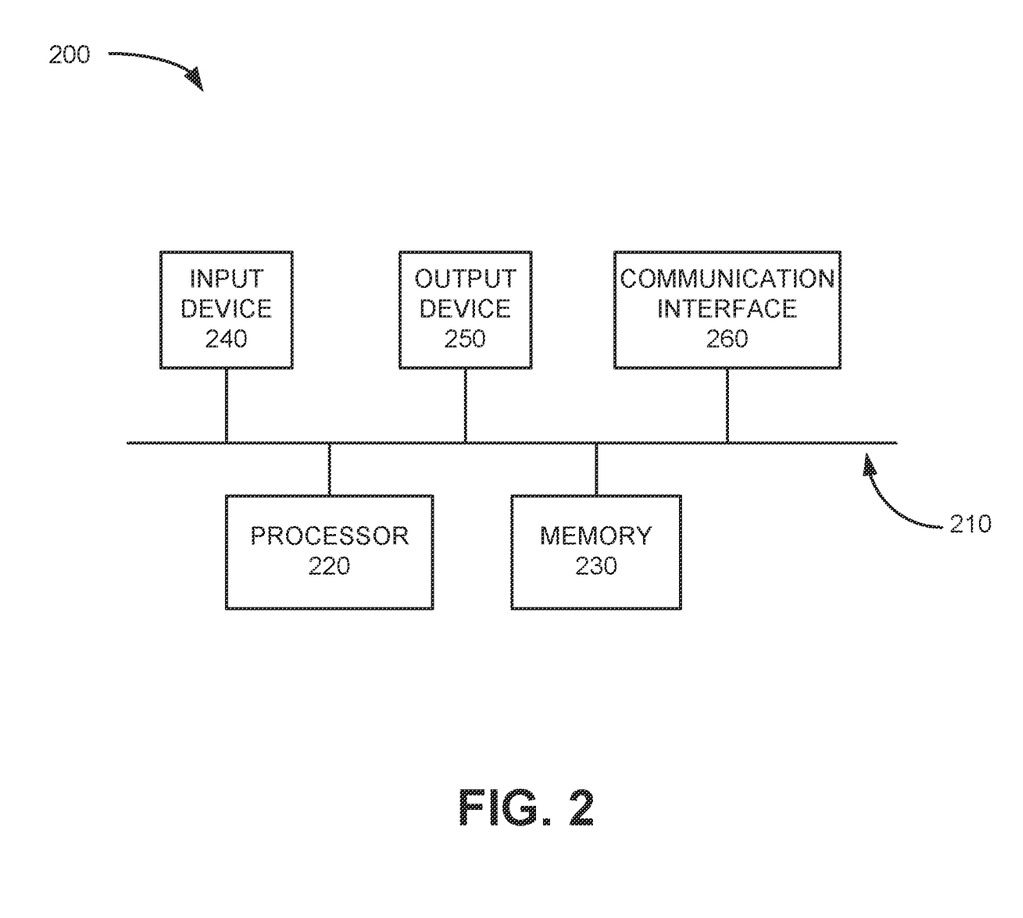
FIG. 2 is a block diagram of components implemented in one or more of the elements of the environment of FIG. 1 in accordance with an exemplary implementation.

FIG. 2 illustrates an exemplary configuration of a device 200. One or more devices 200 may correspond to or be included in UAV 110, GCS 120, third party devices 140, and UAV services platform 150. Referring to FIG. 2, device 200 may include bus 210, processor 220, memory 230, input device 240, output device 250 and communication interface 260. Bus 210 may include a path that permits communication among the elements of device 200.

Processor 220 may include one or more processors, microprocessors, or processing logic that may interpret and execute instructions. Memory 230 may include a random access memory (RAM) or another type of dynamic storage device that may store information and instructions for execution by processor 220. Memory 230 may also include a read only memory (ROM) device or another type of static storage device that may store static information and instructions for use by processor 220. Memory 230 may further include a solid state drive (SSD). Memory 230 may also include a magnetic and/or optical recording medium (e.g., a hard disk) and its corresponding drive.

Input device 240 may include a mechanism that permits a user to input information, such as a keypad, a keyboard, a mouse, a pen, a microphone, a touch screen, voice recognition and/or biometric mechanisms, etc. Output device 250 may include a mechanism that outputs information to the user, including a display (e.g., a liquid crystal display (LCD)), a speaker, etc. In some implementations, device 200 may include a touch screen display may act as both an input device 240 and an output device 250.

Communication interface 260 may include one or more transceivers that device 200 uses to communicate with other devices via wired, wireless or optical mechanisms. For example, communication interface 260 may include one or more radio frequency (RF) transmitters, receivers and/or transceivers and one or more antennas for transmitting and receiving RF data. Communication interface 260 may also include a modem or an Ethernet interface to a LAN or other mechanisms for communicating with elements in a network.

The exemplary configuration illustrated in FIG. 2 is provided for clarity. It should be understood that device 200 may include more or fewer components than illustrated in FIG. 2. For example, for device 200 implemented in UAV 110, device 200 may include a positioning system/satellite navigation system, such as a global positioning system (GPS) component, which may provide position information in relation to a standard reference frame, sensors and control circuitry to control and/or monitor the flight of UAV 110, as well as a battery to power UAV 110.

In an exemplary implementation, device 200 performs operations in response to processor 220 executing sequences of instructions contained in a computer-readable medium, such as memory 230. A computer-readable medium may be defined as a physical or logical memory device. The software instructions may be read into memory 230 from another computer-readable medium (e.g., a hard disk drive (HDD), SSD, etc.), or from another device via communication interface 260. Alternatively, hard-wired circuitry may be used in place of or in combination with software instructions to implement processes consistent with the implementations described herein. Thus, implementations described herein are not limited to any specific combination of hardware circuitry and software.

Figure 3:
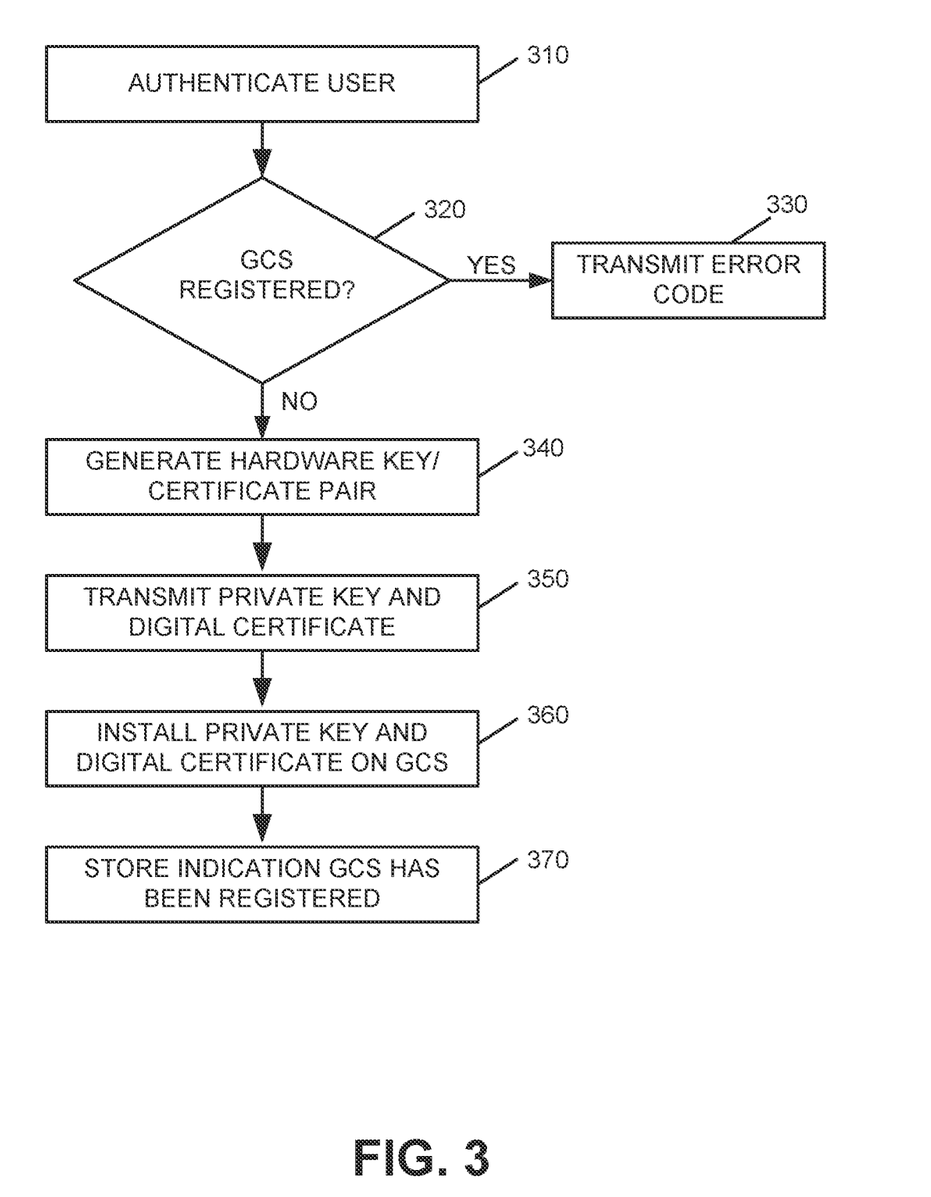
FIG. 3 illustrates a flow diagram illustrating processing associated with registering a ground control station (GCS) in accordance with an exemplary implementation.

FIG. 3 is a flow diagram illustrating processing associated with elements of environment 100 to register GCS 120. The steps described below may be performed by GCS 120, UAV services platform 150, and/or additional elements of environment 100.

Processing may begin with UAV services platform 150 authenticating a user based on receiving user login information (block 310). For example, a user may receive access to GCS 120 and UAV 110 and, prior to initially using GCS 120 and UAV 110, a user may provide login information to UAV services platform 150 via GCS 120. The login information may include, for example, a username and password. In one implementation, the user may login to UAV services platform 150 using a one-way transport layer security (TLS). In another implementation, the user may login to UAV services platform 150 using a two-way TLS. UAV services platform 150 may authenticate the user based on receiving valid login information.

Processing may continue by determining whether GCS 120 has previously been registered (block 320). For example, UAV services platform 150 may receive a request to register GCS 120 and UAV services platform 150 may determine whether GCS 120 has previously been registered. In one implementation, GCS 120 may automatically request to be registered upon being activated for the first time. In another implementation, the user of GCS 120 may request that GCS 120 be registered. If GCS 120 has previously been registered (block 320—YES), UAV services platform 150 may respond with an error message indicating that GCS 120 has already been registered (block 330). The error message may be displayed on GCS 120.

If GCS 120 has not been previously registered (block 330—NO), UAV services platform 150 may generate a hardware key and digital certificate pair for GCS 120 using a public key infrastructure (PKI) (block 340). UAV services platform 150 may additionally store the digital certificate (i.e., an X.509 certificate) in a local database. In this way, GCS 120 may be registered as a hardware device with UAV services platform 150.

In one implementation, the provenance of the key may be handled within a closed system. In this implementation, the issue and validating certificate authority may be a private service, such as a service provided by a telecommunications provider. In this way, a device (e.g., UAV 110, GCS 120, etc.) may be authenticated even if the device does not have access to a public network, such as the Internet. In addition, a non-publicly trusted implementation may provide additional security since the cryptographic hierarch is not shared with publicly available resources.

UAV services platform 150 may issue a private key and digital certificate to GCS 120 (block 350). For example, UAV services platform 150 may transmit the private key and digital certificate to GCS 120 via network 130. The private key and digital certificate may be installed on GCS 120 (block 360). For example, GCS 120 may store the private key and digital certificate locally in a manner that meets predetermined levels of security. In one implementation, GCS 120 may bundle and store the private key and digital certificate in a Public-Key Cryptography Standards (PKCS) #12 file format. UAV services platform 150 may store an indication that CGS 120 has been registered (block 370). For example, UAV services platform 150 may maintain a list or database of registered devices and UAV services platform 150 may add CGS 120 to the list. In this way, UAV services platform 150 may perform a lookup in the database to authenticate GCS 120 before performing operational activities. As described below with respect to FIG. 4, after GCS 120 has been registered, GCS 120 may be used to register UAV 110.

Figure 4:
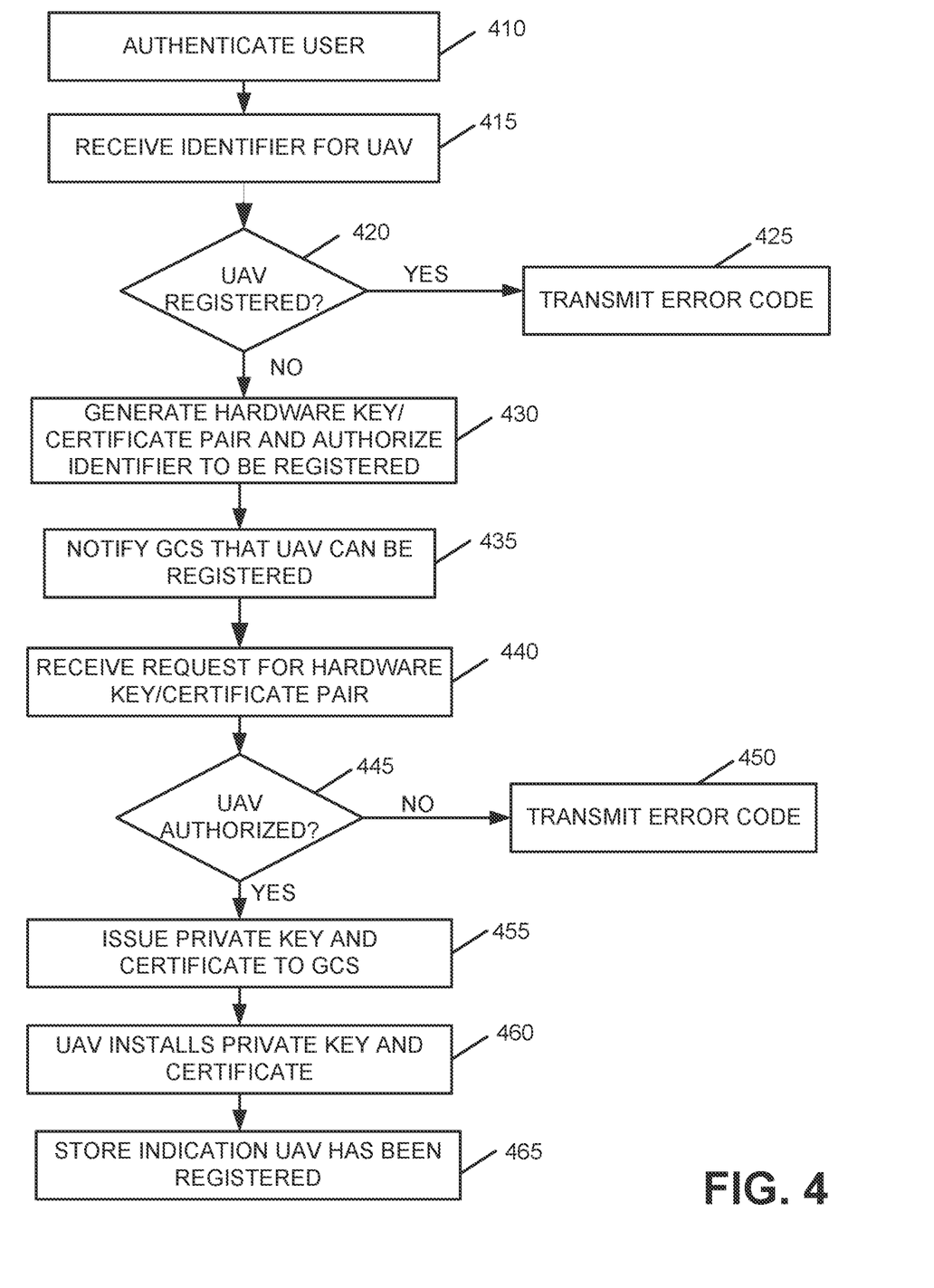
FIG. 4 is a flow diagram illustrating processing associated with registering a UAV in accordance with an exemplary implementation.

FIG. 4 is a flow diagram illustrating processing associated with elements of environment 100 to register UAV 110. The steps described below may be performed by UAV 110, GCS 120, UAV services platform 150, and/or additional elements of environment 100.

Processing may begin with UAV services platform 150 authenticating a user based on receiving user login information (block 410). As described above with respect to FIG. 3, a user may provide login information to UAV services platform 150 using GCS 120. In one implementation, the user may login to UAV services platform 150 via 2-way TLS. UAV services platform 150 may authenticate the user based on receiving valid login information.

Processing may continue by receiving an identifier that uniquely identifies UAV 110 (block 415). For example, UAV services platform 150 may request an identifier associated with UAV 110 in response to receiving a request to register UAV 110. In one implementation, a user may use GCS 120 to request that UAV 110 be registered. In another implementation, UAV services platform 150 may automatically receive a request to register UAV 110 after GCS 120 has been registered. UAV services platform 150 may receive the identifier associated with UAV 110. In one implementation, the user may enter a personal identification number (PIN) or serial number associated with UAV 110 in GCS 120. For example, the PIN or serial number of UAV 110 may be located on UAV 110, on paperwork associated with UAV 110, or the user may have access to the PIN or serial number in another way. In another implementation, the user may use GCS 120 to scan a quick response (QR) code, barcode, or another code located on UAV 110 or in another location to enter the identifier associated with UAV 110. In another implementation, the user may use GCS 120 to obtain a digital certificate associated with UAV 110 via a Wi-Fi or NFC link to determine the unique identifier. In other embodiments, the identifier associated with UAV 110 may be determined in alternative ways.

When UAV services platform 150 receives the unique identifier associated with UAV 110, UAV services platform 150 may determine whether UAV 110 has already been registered (block 420). For example, UAV services platform 150 may search a database to determine whether UAV 110 has been registered. If UAV 110 is already registered (block 420—YES), UAV services platform 150 may respond with an error message indicating that UAV 110 has already been registered (block 425). The error message may be displayed on GCS 120.

If UAV 110 has not been registered (block 420—NO), UAV services platform 150 may generate a hardware key and digital certificate pair for UAV 110 using PKI services and may authorize the unique identifier associated with UAV 110 to be registered (block 430). UAV services platform 150 may notify GCS 120 that UAV 110 can be registered (block 435) and UAV services platform 110 may receive a request from UAV 110 for the hardware key and digital certificate pair for UAV 110 (block 440). For example, UAV 110 may transmit a certificate signing request (CSR) to UAV platform services 150 that includes the unique identifier of UAV 110.

UAV services platform 150 may determine whether UAV 110 is authorized for registration (block 445). For example, UAV services platform 150 may receive the CSR from UAV 110 and may determine whether UAV 110 is authorized to be registered. In one implementation, UAV services platform 150 may check a revocation list to determine whether UAV 110 or a hardware key associated with UAV 110 is on the revocation list. In another implementation, UAV services platform 150 may determine whether UAV 110 or a hardware key associated with UAV 110 is on an allowed or authorized list. If UAV 110 or the hardware key associated with UAV 110 is on the revocation list (or is not on the allowed list), UAV services platform may determine that UAV 110 is not authorized for registration (block 445—NO) and UAV services platform 150 may send an error message to GCS 120 (block 450). The error message may indicate that UAV 110 is not authorized for registration.

If UAV 110 or the hardware key associated with UAV 110 is on the allowed list (block 445—YES), UAV services platform 150 may issue a private key and digital certificate (i.e., X.509 certificate) to CGS 120 for installation on UAV 110 (block 455). The private key and digital certificate may be installed on UAV 110 (block 460) and UAV 110 may be registered for performing operational activities. UAV services platform 150 may store an indication that UAV 110 has been registered (block 465). For example, UAV services platform 150 may add an identifier associated with UAV 110 to a list or database of registered devices. In this way, UAV services platform 150 may perform a lookup in the database to authenticate UAV 110 before performing operational activities.

Figure 5:
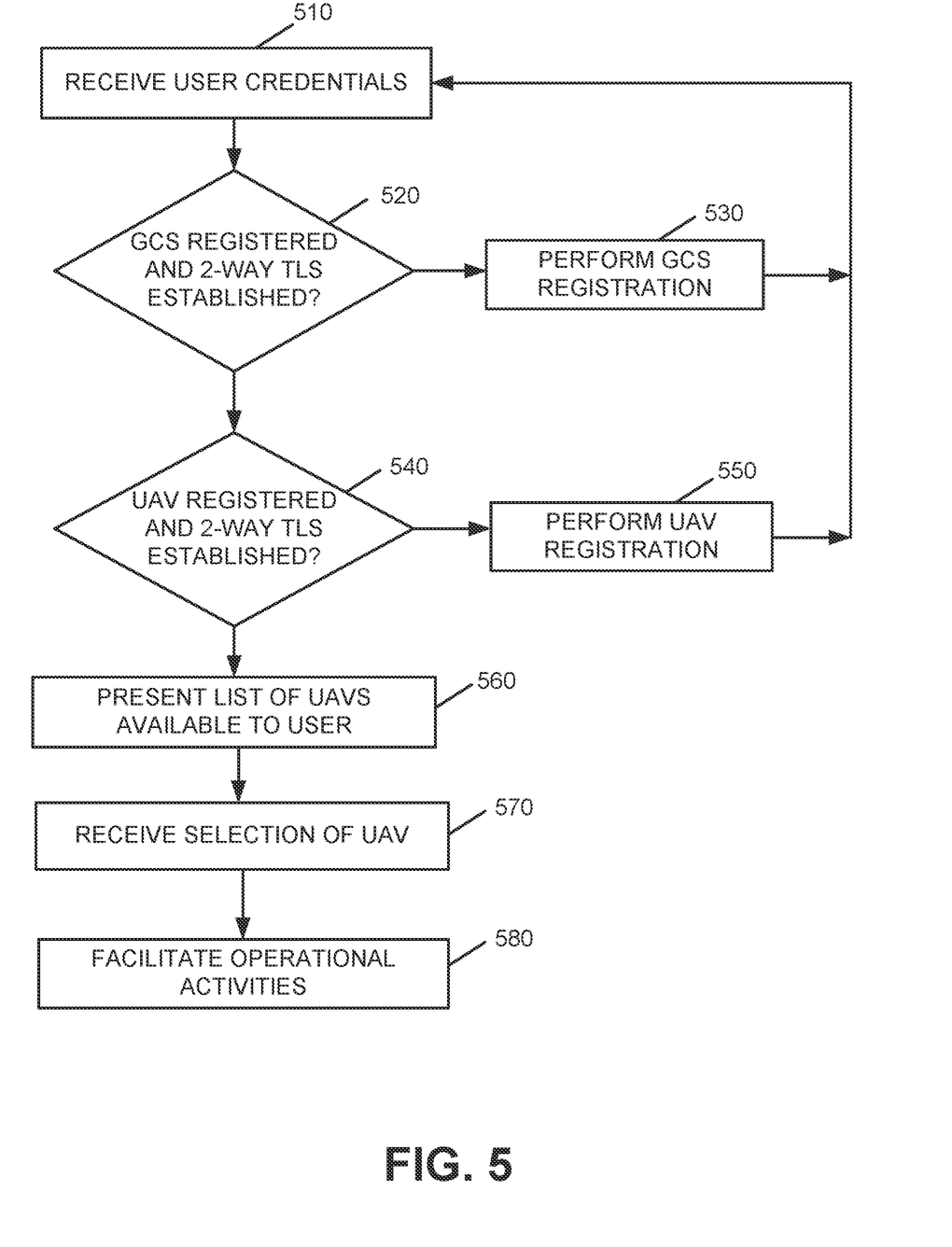
FIG. 5 is a flow diagram illustrating processing associated with authenticating a GCS and a UAV in accordance with an exemplary implementation.

FIG. 5 is a flow diagram illustrating processing associated with elements of environment 100 to authenticate a user, GCS 120, and UAV 110 prior to performing operational activities. The steps described below may be performed by UAV 110, GCS 120, UAV services platform 150, and/or additional elements of environment 100.

Processing may begin by UAV services platform 150 receiving user credentials (block 510). For example, a user may turn on UAV 110 and may log into UAV services platform 150 by entering credentials on GCS 120. For example, the user may enter a username and password. Alternatively, the user may log in using biometric data, such as a fingerprint or facial recognition, or the user may use another method for logging in.

After receiving the user credentials, UAV services platform 150 may determine whether GCS 120 has been registered and a two-way TLS has been established with GCS 120 (block 520). For example, based on receiving credentials for an authorized user, UAV services platform 150 may perform a lookup in a database to determine whether GCS 120 has been registered. In addition, UAV services platform 150 and GCS 120 may establish a two-way TLS.

Figure 6:
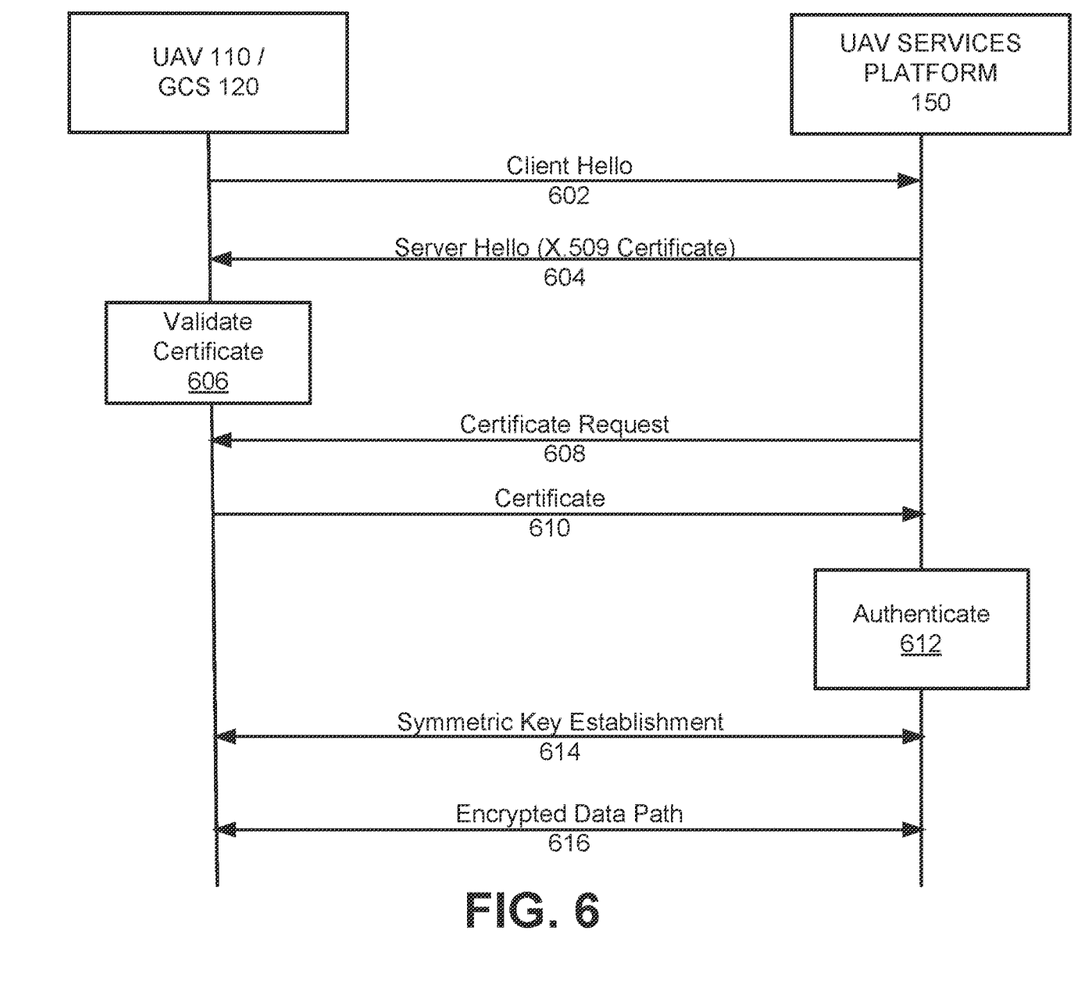
FIG. 6 is a diagram illustrating processing associated with establishing encrypted data paths for a GCS and a UAV in accordance with an exemplary implementation.

FIG. 6 is a diagram illustrating the process of establishing a two-way TLS using the certificate stored during registration of GCS 120. As shown in FIG. 6, messages may be exchanged between UAV 110/GCS 120 and UAV services platform 150 in order to establish a two-way TLS using certificates associated with UAV 110, GCS 120, and UAV services platform 150. Although FIG. 6 is described below with regard to establishing an encrypted data path between GCS 120 and UAV services platform 150, a similar process may be performed to establish an encrypted data path between UAV 110 and UAV services platform 150.

As shown in FIG. 6, GCS 120 may send UAV services platform 150 a client hello message 602. Client hello message 602 may include the user credentials, as described above with respect to FIG. 5. UAV services platform 150 may respond by sending GCS 120 a server hello message 604. Server hello message 604 may include a X.509 certificate associated with UAV services platform 150. GCS 120 may validate the certificate received from UAV services platform 150 (606). For example, GCS 120 may validate the X.509 certificate using a certificate authority root chain.

UAV services platform 150 may additionally send GCS 120 a client certificate request 608 and, after GCS 120 validates the certificate received from UAV services platform 150, GCS 120 may transmit the certificate associated with GCS 120 to UAV services platform 150 (610). The X.509 certificate may have been stored at GCS 120 during registration of GCS 120, as described above with respect to FIG. 3. UAV services platform 150 may receive the certificate from GCS 120, identify GCS 120 using the X.509 certificate, and may authenticate GCS 120 using the certificate (612).

After GCS 120 has been authenticated by UAV services platform 150, a symmetric key establishment or exchange may be performed between UAV services platform 150 and GCS 120 (614). After the symmetric key establishment or exchange has been performed, an encrypted data path may be established via the symmetric key (616). In this way, data exchanged between GCS 120 and UAV services platform 150 may be encrypted and exchanged in a secure manner.

Returning to FIG. 5, if GCS 120 has not been registered (block 520—NO), UAV services platform 150 may register GCS 120 (block 530). For example, UAV services platform 150 may perform the steps described above with respect to FIG. 3 to register GCS 120. After GCS 120 has been registered, processing may return to UAV services platform 150 receiving user credentials (block 510).

If GCS 120 has been registered and a two-way TLS has been established between UAV services platform 150 and GCS 120 (block 520—YES), UAV services platform 150 may determine whether UAV 110 has been registered and a two-way TLS has been established (block 540). For example, UAV services platform 150 may perform a lookup in a database to determine whether UAV 110 has previously been registered. In addition, UAV 110 and UAV services platform 150 may perform the steps described above with respect to FIG. 6 to establish an encrypted data path between UAV 110 and UAV services platform 150 using the certificate stored on UAV 110. If UAV 110 has not been registered (block 540—NO), UAV services platform 150 may register UAV 110 (block 550). For example, UAV services platform 150 may perform the steps described above with respect to FIG. 4 to register UAV 110. After UAV 110 has been registered, processing may return to UAV services platform 150 receiving user credentials (block 510).

If UAV 110 has been registered and a two-way authentication has been established, UAV services platform 150 may present a list of UAVs 110 available to the user for performing operational activities (block 560). For example, based on the user's credentials, UAV services platform 150 may determine which registered UAVs 110 the user is authorized to operate. UAV services platform 150 may present the list to the user on a display of GCS 120. UAV services platform 150 may receive a selection of a UAV 110 on the list of UAVs (block 570). For example, the user may determine which UAV 110 is intended for use in an operation and may select the UAV 110 from the list of available UAVs 110 presented on GCS 120. After receiving the selection of UAV 110, UAV services platform 150 may facilitate operational activities of UAV 110 (block 580). For example, UAV services platform 150 may provide services while UAV 110 performs operational activities in conjunction with GCS 120. Because the user, UAV 110, and GCS 120 have been authenticated and secure connections have been established, the operational activities may be performed securely and commands and telemetry data may be safely transmitted over network 130.

Figure 7:
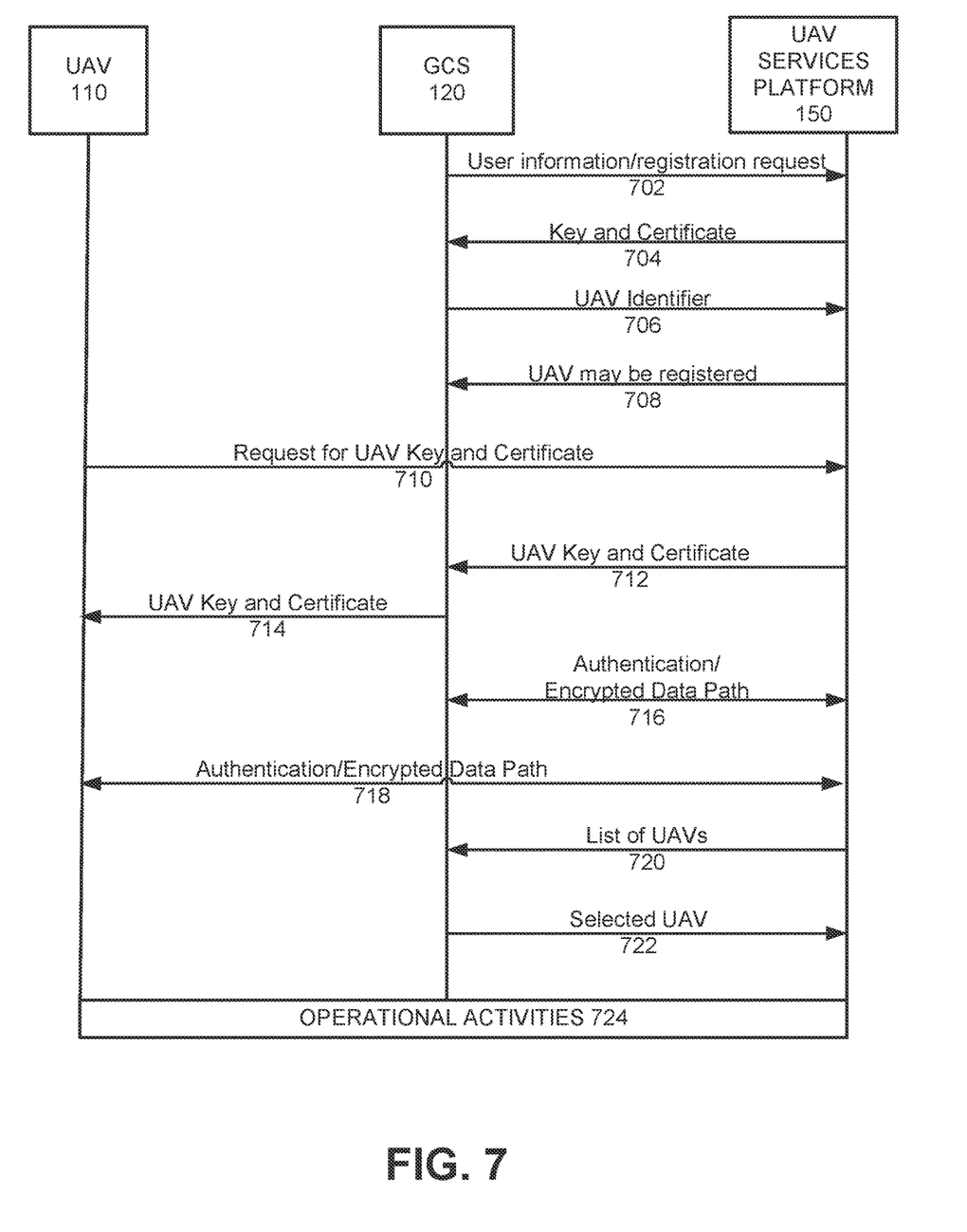
FIG. 7 is a diagram illustrating processing associated with registering and authenticating a GCS and a UAV in accordance with an exemplary implementation.

FIG. 7 is a diagram illustrating messages that may be exchanged among UAV 110, GCS 120, and UAV services platform 150 during registration and authentication of UAV 110 and GCS 120 in order to perform operational activities, as described above with respect to FIGS. 3-6.

FIG. 7 may begin with GCS 120 transmitting user information and a request to register GCS 120 to UAV services platform 150 (702). For example, as described above with respect to FIG. 3, GCS 120 may transmit user login information to UAV services platform 150 when the user initially powers on GCS 120. GCS 120 may additionally transmit a request to register GCS 120. UAV services platform 150 may generate a hardware key and digital certificate pair for GCS 120 and may transmit the hardware key and digital certificate pair to GCS 120 (704) to be stored on GCS 120 to register GCS 120.

After GCS 120 is registered with UAV services platform 150, GCS 120 may transmit user information and an identifier associated with UAV 110 to UAV services platform 150 in order to register UAV 110 (706). UAV services platform 150 may generate a hardware key and digital certificate pair for UAV 110 and may authorize the unique identifier associated with UAV 110 to be registered. UAV services platform 150 may transmit an indication to GCS 120 that UAV 110 may be registered (708) and UAV 110 may transmit a request for the hardware key and digital certificate pair for UAV 110 (710). UAV services platform 150 may determine that UAV 110 is authorized to be registered and UAV services platform 150 may issue a private key and digital certificate to CGS 120 for installation on UAV 110 (712). GCS 120 may transmit the private key and digital certificate to UAV 110 to be stored on UAV 110 to complete the registration of UAV 110 (714).

After GCS 120 and UAV 110 have been registered, GCS 120 and UAV 110 may be authenticated by UAV services platform 150 to perform operational activities. Continuing with FIG. 7, UAV services platform 150 may authenticate GCS 120 (as described above with respect to FIG. 6) and an encrypted data path may be established between GCS 120 and UAV services platform 150 (716). Similarly, services platform 150 may authenticate UAV 110 and an encrypted data path may be established between UAV 110 and UAV services platform 150 (718).

Based on the user's credentials received during authentication, UAV services platform 150 may determine which registered UAVs 110 the user is authorized to operate and UAV services platform 150 may transmit the list of UAVs 110 to GCS 120 (720). GCS 120 may transmit an indication of a selected UAV 110 from the list to UAV services platform (722). Based on authenticating the user, GCS 120, and UAV 110, UAV services platform 150 may facilitate operational activities between GCS 120 and UAV 110 (724).

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks have been described with regard to FIGS. 3-5 and a series of message/operation flows have been described with regard to FIGS. 6 and 7, the order of the message/operation flows and blocks may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

What is claimed is:
1. A method comprising:
  receiving, by an unmanned aerial vehicle (UAV) services device and from a ground control station (GCS), credentials associated with a user, wherein the ground control station is associated with a UAV, and wherein the UAV services device is located externally with respect to the GCS and the UAV;
  determining, by the UAV services device, whether the GCS has been registered with the UAV services device;

determining, by the UAV services device and in response to determining that the GCS has been registered with the UAV services device, whether the UAV has been registered;
providing, by the UAV services device and in response to determining that the UAV has been registered, a list of a plurality of UAVs the user is authorized to operate;
receiving selection of a particular UAV from the list of the plurality of UAVs; and
facilitating operational activities of the particular UAV.

2. The method of claim 1, wherein determining whether the GCS has been registered with the UAV services device further comprises determining whether a secure two-way connection has been established with the GCS.

3. The method of claim 1, wherein determining whether the UAV has been registered further comprises determining whether a secure two-way connection has been established with the UAV.

4. The method of claim 1, further comprising:
registering the GCS with the UAV services device in response to determining that the GCS has not been registered with the UAV services device.

5. The method of claim 4, wherein registering the GCS comprises:
generating a hardware key and certificate pair for the GCS; and
transmitting the hardware key and certificate pair to the GCS for installation on the GCS.

6. The method of claim 1, further comprising:
registering the UAV in response to determining that the UAV has not been registered.

7. The method of claim 6, wherein registering the UAV comprises:
generating a hardware key and certificate pair for the UAV; and
transmitting the hardware key and certificate pair to the GCS for installation on the UAV.

8. A device comprising:
a memory; and
a processor configured to:
receive, from a ground control station (GCS), credentials associated with a user, wherein the ground control station is associated with an unmanned aerial vehicle (UAV), wherein the device is located externally with respect to the GCS and the UAV;
determine whether the GCS has been registered with the device;
determine, in response to determining that the GCS has been registered with the device, whether the UAV has been registered;
present, in response to determining that the UAV has been registered, a list of a plurality of UAVs the user is authorized to operate;
receive selection of a particular UAV from the list of the plurality of UAVs; and
facilitate operational activities of the particular UAV.

9. The device of claim 8, wherein, when determining whether the GCS has been registered with the device, the processor is further configured to:
determine whether a secure two-way connection has been established with the GCS.

10. The device of claim 8, wherein, when determining whether the UAV has been registered, the processor is further configured to:
determine whether a secure two-way connection has been established with the UAV.

11. The device of claim 8, wherein the processor is further configured to:
register the GCS with the device in response to determining that the GCS has not been registered with the device.

12. The device of claim 11, wherein, when registering the GCS, the processor is further configured to:
generate a hardware key and certificate pair for the GCS; and
transmit the hardware key and certificate pair to the GCS for installation on the GCS.

13. The device of claim 8, wherein the processor is further configured to:
register the UAV in response to determining that the UAV has not been registered.

14. The device of claim 13, wherein, when registering the UAV, the processor is further configured to:
generate a hardware key and certificate pair for the UAV; and
transmit the hardware key and certificate pair to the GCS for installation on the UAV.

15. A non-transitory computer-readable medium having stored thereon sequences of instructions that, when executed by at least one processor included in a device located externally with respect to a ground control station (GCS) and an unmanned aerial vehicle (UAV), cause the at least one processor to:
receive, from the GCS, credentials associated with a user, wherein the ground control station is associated with the UAV;
determine whether the GCS has been registered with the device;
determine, in response to determining that the GCS has been registered with the device, whether the UAV has been registered;
present, in response to determining that the UAV has been registered, a list of a plurality of UAVs the user is authorized to operate;
receive selection of a particular UAV from the list of the plurality of UAVs; and
facilitate operational activities of the particular UAV.

16. The non-transitory computer-readable medium of claim 15, wherein the instructions that cause the at least one processor to determine whether the GCS has been registered with the device further include instructions that cause the at least one processor to:
determine whether a secure two-way connection has been established with the GCS.

17. The non-transitory computer-readable medium of claim 15, wherein the instructions that cause the at least one processor to determine whether the UAV has been registered further include instructions that cause the at least one processor to:
determine whether a secure two-way connection has been established with the UAV.

18. The non-transitory computer-readable medium of claim 15, wherein the instructions further cause the at least one processor to:
register the GCS in response to determining that the GCS has not been registered with the device; and
register the UAV in response to determining that the UAV has not been registered with the device.

19. The non-transitory computer-readable medium of claim 18, wherein the instructions that cause the at least one processor to register the GCS further include instructions that cause the at least one processor to:

generate a hardware key and certificate pair for the GCS; and transmit the hardware key and certificate pair to the GCS for installation on the GCS.

20. The non-transitory computer-readable medium of claim 18, wherein the instructions that cause the at least one processor to register the UAV further include instructions that cause the at least one processor to:

generate a hardware key and certificate pair for the UAV; and transmit the hardware key and certificate pair to the GCS for installation on the UAV.

* * * * *